US012340351B2

United States Patent
Tan et al.

(10) Patent No.: US 12,340,351 B2
(45) Date of Patent: Jun. 24, 2025

(54) SYSTEMS AND METHODS FOR USE IN CANCELLATION OF OR CLOSURE OF NETWORK REQUESTS

(71) Applicant: VOCALINK INTERNATIONAL LIMITED, London (GB)

(72) Inventors: An Ni Tan, London (GB); Emma Rayment, Hemel Hempstead (GB); Debarshi Debnath, London (GB)

(73) Assignee: VOCALINK INTERNATIONAL LIMITED, London (GB)

( * ) Notice: Subject to any disclaimer, the term of this patent is extended or adjusted under 35 U.S.C. 154(b) by 11 days.

(21) Appl. No.: 17/946,667

(22) Filed: Sep. 16, 2022

(65) Prior Publication Data
US 2024/0095691 A1 Mar. 21, 2024

(51) Int. Cl.
*G06Q 20/02* (2012.01)
*G06Q 20/10* (2012.01)

(52) U.S. Cl.
CPC ........... *G06Q 20/02* (2013.01); *G06Q 20/102* (2013.01)

(58) Field of Classification Search
None
See application file for complete search history.

(56) References Cited

U.S. PATENT DOCUMENTS

| | | | | |
|---|---|---|---|---|
| 8,751,386 | B2* | 6/2014 | Schryer | G06Q 30/02 705/40 |
| 10,453,040 | B1* | 10/2019 | Kibble-Smith | G06Q 20/102 |
| 10,963,589 | B1* | 3/2021 | Fakhraie | H04L 63/20 |
| 2004/0215560 | A1* | 10/2004 | Amalraj | G06Q 20/04 705/40 |
| 2007/0255653 | A1* | 11/2007 | Tumminaro | G06Q 20/3255 705/39 |
| 2012/0136780 | A1* | 5/2012 | El-Awady | G06Q 20/102 705/40 |
| 2017/0221066 | A1* | 8/2017 | Ledford | G06Q 20/4016 |
| 2020/0126091 | A1* | 4/2020 | Kim | G06Q 20/425 |

* cited by examiner

*Primary Examiner* — Peter D Nolan
*Assistant Examiner* — Matthew Cobb
(74) *Attorney, Agent, or Firm* — Harness, Dickey & Pierce, P.L.C.

(57) ABSTRACT

Systems and methods are provided for cancelling or closing requests. One example computer-implemented method includes receiving, by a computing device, from a service provider, a request indicative of a payment action by a third party and issuing a first technical acknowledgment to the service provider including a unique identifier for the payment action. The method also includes forwarding, by the computing device, the request to the third party and receiving, from the third party, a confirmation advise including a status specific to the request. Then, the method includes receiving, by the computing device, an end request including the unique identifier specific to the request and, in response to the end request, changing the status of the request to cancelled or closed and forwarding the end request to the third party.

9 Claims, 5 Drawing Sheets

SYSTEMS AND METHODS FOR USE IN CANCELLATION OF OR CLOSURE OF NETWORK REQUESTS

FIELD

The present disclosure is generally directed to systems and methods for use in cancellation of or closure of (and cancelling or closing), network requests.

BACKGROUND

This section provides background information related to the present disclosure which is not necessarily prior art.

In various networks, requests are provided to initiate one or more services. In the context of billing, payment requests are issued by biller service providers, and processed, whereby funds are transferred from a user indebted to a biller (e.g., for products, services, etc.) to the biller. From time to time, though, the payment requests may need to be cancelled or closed based on factors, such as, for example, duplicate bills, new bills, or payment terms having already been satisfied, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Users may pay for products and services through multiple or repeat billings from a biller, whereby the users pay, periodically, for the products, services, etc., through a biller service provider associated with the biller. In connection therewith, the biller and/or the biller service provide may implement the billings through a bill pay platform. For example, for a given bill for a user, the biller service provider may issue a payment request (on behalf of the biller) to a payer institution associated with the user. In some instances, after the payment request is issued for the bill, it may become apparent to the biller and/or the biller service provider that the bill is erroneous (e.g., a duplicate, a wrong amount, already paid, etc.). Despite the realization, the payer institution may still initiate a transfer of funds to the biller consistent with the bill, whereby (due to the erroneous bill) the transfer will ultimately have to be reversed, or otherwise corrected.

Uniquely, the systems and methods herein provide for cancellation of or closure of network requests related to billing and bill payments (e.g., cancellation of payment requests for bills, etc.), after submission of the requests from a biller service provider to a payer institution. In particular, when such cancellation is required, the biller service provider compiles and issues a cancellation request to the payer institution, in which a reason code for the cancellation is provided. The payer institution then has the option to accept or decline the cancellation. In this manner, in processing the requests for bill payments, the requests/payments may be halted and cancelled, rather than being completed (and then subsequently requiring reversal). As such, the systems and methods herein provide for reduced network traffic, along (or within or through) the billing architecture/bill pay platform described herein.

Figure 1:
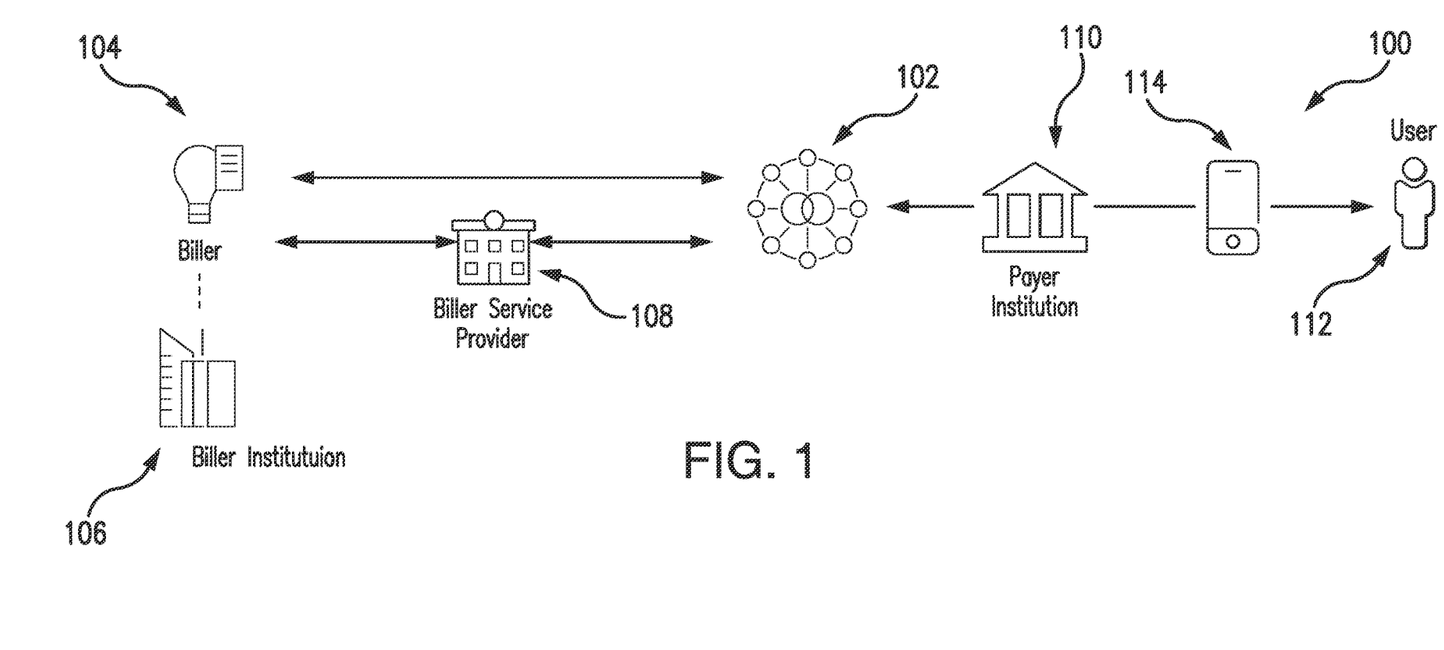
FIG. 1 illustrates an example system of the present disclosure suitable for use in cancelling network requests associated with providers (e.g., biller service providers, etc.)

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, billing schemes, parties involved in billing and/or payment, privacy concerns and/or requirements, etc.

The illustrated system 100 generally includes a platform 102, a biller 104, a biller institution 106 associated with the biller 104, a biller service provider 108 and a payer institution 110 associated with a user 112, each of which is coupled to one or more networks. The network(s) (as indicated by the arrowed lines in FIG. 1) may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the network(s) may include multiple different networks, where one or more of the multiple different networks are then accessible to particular ones of the platform 102, the biller service provider 108 and the institutions 106 and 110, etc.

In this example embodiment, the platform 102 is generally configured as a billing platform to host billing messaging, whereby payment requests are submitted and transferred consistent with the requests. The platform 102 may be specific to the operations described herein, or may be integrated, in whole or in part, into a processing network, such as, for example, the Mastercard® processing network, etc.

At the outset, the user 112 interacts with the biller 104, whereby one or more services, products, etc., are delivered to the user 112. For example, the services may include a telecommunications service, whereby the biller 104 includes a telecommunications operator (e.g., a cable company, a mobile phone carrier, etc.). Additionally, or alternatively, the product/service may be discrete and/or ongoing, etc. For example, the biller 104 may deliver a product once, from which the biller 104 bills the user 112 over a term of payments (e.g., three months, six months, twenty-four months, etc.), or may deliver the product daily, weekly, or monthly, etc., from which the biller bills the user 112 for delivery of each product in total (at each time of delivery), etc. In connection with the above, the user 112 and the biller 104 may establish a link to confirm/validate (or otherwise confirm/validate) they have a relationship, whereby the biller 104 proceeds with a payment request (as described next). In this example, the user 112 may not need to provide payment information directly to the biller 104. Instead, the biller 104 may initiate the payment request via the biller service provider 108, and the biller service provider 108 then identifies the payer institution 110 of the user 112.

In turn, the biller 104, as shown in FIG. 1, is configured to setup, with the biller service provider 108, a billing schedule for the user 112 (for the products/services) to be paid by (or from) the account. The billing schedule may include, without limitation, an amount for payment, a time/day/interval for the payments to be made, a number of payments, etc. In one example, the billing schedule includes a set amount once per month (e.g., to be paid on the first business day of each month, etc.), while another example billing schedule includes a variable amount billed weekly or monthly, etc. In setting up the billing schedule, the biller 104 may submit the individual bill to the biller service provider 108 once generated (e.g., generally immediately following the interaction with the user 112, etc.), via an API, or may submit the bill together with other bills for multiple different users (not shown) as a batch file of bills.

Once the billing schedule is generated, the biller service provider 108 is configured to request a transfer of funds, consistent with the payment terms of the billing schedule, from the platform 102. The request may be submitted by the biller service provider 108 to the platform 102 via an API exposed by the platform 102 (e.g., consistent with a JSON API format, etc.), or otherwise (e.g., via a processing network associated with the platform, etc.).

When a request for the transfer is received by the platform 102 for a given bill, the platform 102 is configured to submit the request, in this example, to the payer institution 110, as identified by the account number and/or other payment information included in the request. The payer institution 110 may be configured to process the request, for example, by transferring funds consistent with the request, directly or potentially after verifying the request with the user 112 (e.g., via a notification to a mobile device or communication device 114, as shown in FIG. 1, etc.). In connection therewith, the payer institution 110 is configured to communicate a status of the transfer to the platform 102 (e.g., as part of a payment confirmation advise, etc.), and to update the status as needed consistent with the status of processing the request (e.g., via an API associated with the platform 102 (e.g., consistent with a JSON API format, etc.), etc.). Example statuses may include settled, declined, rejected, scheduled, approved, etc. And, the platform is configured to store the status of the request in a data structure in memory therein.

It should be appreciated that based on the response from the payer institution 110, the platform 102 is configured to coordinate, directly or indirectly, the transfer of funds for the bill (consistent with the request) and associated confirmations. In addition, the platform 102 may be configured to transmit a confirmation to the biller service provider 108 upon receipt of the request (confirming that the request has been received), along with a unique identifier (e.g., an identifier represented by an alphanumeric string or otherwise, etc.) for the request.

In connection with the above, from time to time, the biller service provider 108 may identify a payment request for a bill as being sent in error or no longer required, after submitting the request, but prior to receiving payment of the bill based on the request. For instance, an error may arise where the payment request is incorrect (e.g., includes incorrect information, etc.) or is duplicative of another request, etc. Alternatively, the payment request may no longer be needed where sufficient funds have already been received for the underlying bill (such that the bill has already been paid) or where a new or updated payment request has been submitted (such that the current payment request is no longer needed), etc. In instances where the payment request is in error, the biller service provider 108 is configured to submit a payment request cancellation (cancellation request) to the platform 102 (broadly, an end request, or an end or termination of the payment request and/or corresponding transaction). In instances where the payment request is no longer needed, the biller service provider 108 is configured to submit a payment request closure (or closure request) to the platform 102 (also broadly, an end request, or an end or termination of the payment request and/or corresponding transaction). In both instances, the payment request cancellation and the payment request closure (broadly, the end or termination of the payment request and/or corresponding transaction), each includes a unique identifier provided from the platform 102 (in response to the payment request) and a reason code indicative of the reason for the cancellation or closure. It should be appreciated that payment requests may be processed, by the payer institution 110, within hours or days of receipt, whereby the payment request cancellation or payment request closure may be submitted prior to a transfer of funds consistent with the payment request being triggered and/or initiated (and depending on the reason for the payment request closure, etc.). As such, the payment request cancellation is generally submitted immediately upon realization that the payment request is in error (e.g., as long as the current payment request is active, etc.) and the payment request closure is generally submitted immediately upon realization that the payment request is no longer needed.

In implementing the features herein with regard to cancellation or closure of payment requests, the platform 102 may be uniquely configured (e.g., via executable instructions, etc.) with (or as) an application programming interface (API) operable to submit the payment request cancellation or payment request closure as described herein. In connection therewith, the platform 102 is particularly configured, for example, in response to the payment request cancellation, to reject a subsequent payment confirmation with a scheduled status sent against the same bill, thereby indicating the platform 102 should not support further payments with regard to the bill. It should be appreciated that the platform 102 may still accept payment confirmation advise messages indicating payment has been triggered since the funds have moved. In this example, therefore, only the scheduled payment confirmation is rejected, so that the payer institution 110 has the opportunity to stop the payment going ahead.

That said, in response to the payment request cancellation or payment request closure, the platform 102, in turn, is configured to validate the payment request cancellation or payment request closure and, when validated, to change a status of the payment request (in a data structure in memory therein) to cancelled or closed (depending on the scenario). The platform 102 is configured to communicate the payment request cancellation or payment request closure to the payer institution 110.

The payer institution 110, in turn, is configured to update the status of the payment request to cancelled or closed, for example, as appropriate. The payer institution 110 is also configured to notify the user 112 (e.g., transmit a notification to the user 112 at the user's mobile device, etc.) that the payment request has been cancelled or closed (again, as appropriate depending on the scenario). The payer institution 110 is further configured to transmit a technical acknowledgement back to the platform 102, where the acknowledgment includes a disposition/confirmation of the payment request cancellation or payment request closure. The platform 102 may then (optionally) be configured to notify the biller service provider 108 of the same, whereupon the biller service provider 108 is configured to respond accordingly (e.g., resolved the transaction as closed, resolved the transaction as cancelled, seek reversal of the transfer, etc.).

Additionally, in some example embodiments, upon receipt of the payment request cancellation from the platform 102, the payer institution 110 may be configured to evaluate the cancellation and either accept or decline the cancellation (e.g., based on the parties involved in the underlying request, based on a history of one or more parties involved in the underlying request, based on a market location in which the system 100 is implemented, etc.) (e.g., via an API, etc.). In such embodiments, the payer institution 110 is then further configured to transmit a response to the cancellation request (e.g., a separate API responding to the cancellation request, etc.) back to the platform 102, where the response includes a disposition/confirmation of the payment request cancellation indicating whether the cancellation is accepted or declined. The platform 102 may then be configured to forward the response to the cancellation request (and corresponding indication of acceptance or decline) to the biller service provider 108, whereupon the biller service provider 108 is configured to respond with a technical acknowledgement thereof back to the platform 102. In this way, the biller service provider 108 is also aware of the updated status of the cancellation (either accepted or declined). Additionally, the biller service provider 108 may notify the biller 104 of the updated status of the cancellation so that the biller 104 is also aware and may proceed accordingly (e.g., seek reversal of the transaction when the payment request cancellation is declined or otherwise remedy the transfer, etc.).

It should be appreciated that the communications between the platform 102, the biller service provider 108, and the payer institution 110 may be consistent with the ISO 20022 CAMT.055 standard, the ISO 20022 CAMT.029 standard, or other suitable standard, such as, for example, a JSON API format, etc. That said, the communication(s) herein may be specified in one or more of the above formats. In addition, when a communication herein is received (e.g., by the platform 102, etc.) in a format other than the given standard format, the platform 102 may be configured to convert the communication to the particular standard format.

Figure 2:
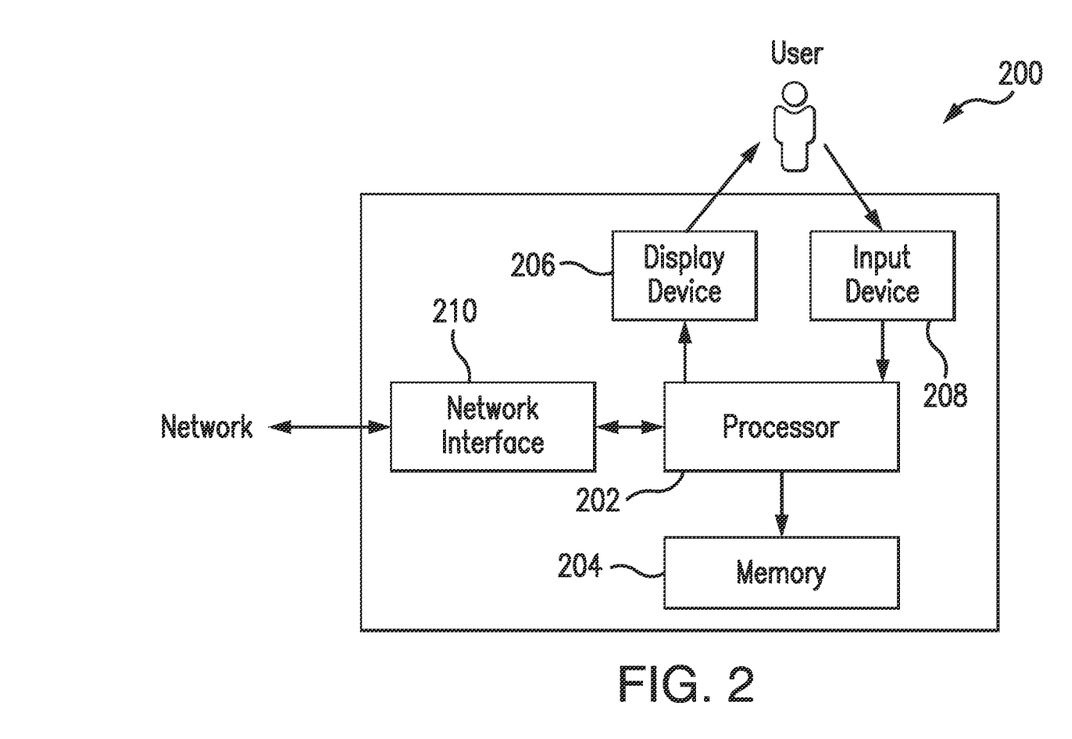
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the platform 102, the biller 104, the biller institution 106, the biller service provider 108, the payer institution 110 and the communication device 114 may be considered, may include, and/or may be implemented in a computing device consistent with the computing device 200, coupled to (and in communication with) the one or more networks of the system 100. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, billing schedules, request status indicators, messages, notifications, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 and an input device 208.

The presentation unit 206 is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., identifying information, requests to accept/confirm cancellation, etc.), etc. And, various interfaces may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

The input device 208 receives inputs from the user 112 (i.e., user inputs) of the computing device 200 such as, for example, inputs to cancel or close a request, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein and/or with other devices described herein. In some example embodiments, the computing device 200 may include the processor 202 and one or more network interfaces incorporated into or with the processor 202.

Figure 3:
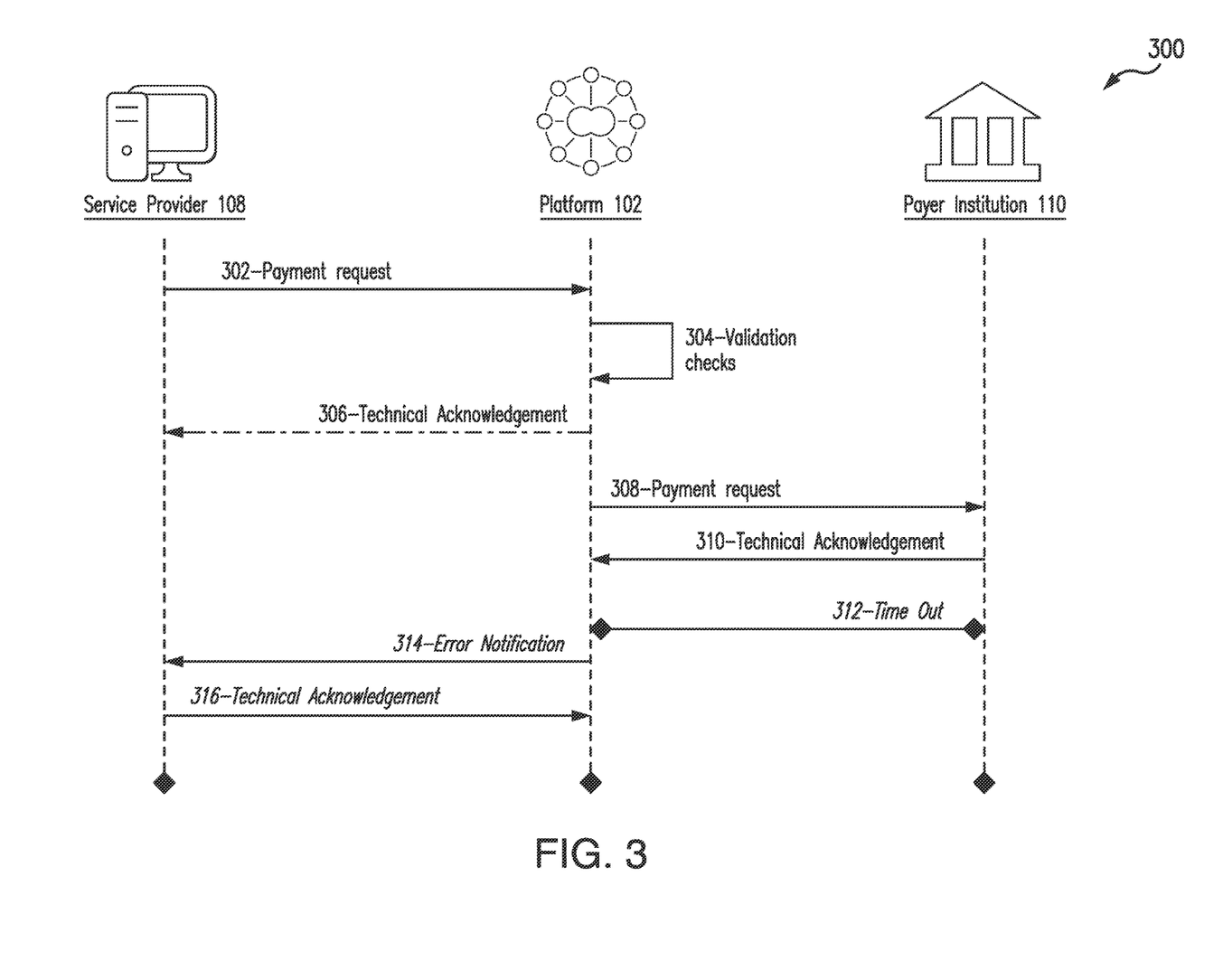
FIG. 3 illustrates an example method, which may be implemented in connection with the system of FIG. 1, for use in submitting a payment request by a biller service provider.

FIG. 3 illustrates an example method 300 for use in issuing a payment request, for example, for payment of a bill by the user 112 to the biller 104. The example method 300 is described as implemented in system 100, with reference to the platform 102, the service provider 108 and the payer institution 110, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 300.

Initially, it should be understood that the user 112 and the biller 104 have agreed that the user 112 would pay the biller 104 an amount by a particular time (e.g., by a due date as indicated by a bill provided by the biller 104, etc.). The user 112 may determine whether to pay earlier or divide the amount into multiple payments. The biller service provider 108 is then empowered to initiate a transfer of funds according to one or more billing schedules consistent with the bill (be it a single payment for the amount of one bill or multiple payments spread over time for the amount of one bill). In turn, consistent with the billing schedule(s), the biller service provider 108 submits, at 302, a payment request to the payment platform 102 for the bill. The payment request includes an identifier associated with the user 112 and/or an account for the user 112 (issued by the payer institution 110) and an amount to be transferred or paid to the biller 104. The payment request may be in the form of an e-bill or electronic bill, for example.

In response, the payment platform 102 validates the payment request, at 304. The validation may include a check to confirm that the payment request is in an appropriate structure (e.g., a JSON format, etc.), and/or that the appropriate information is included, such as, for example, a complete and proper identifier for the account of the user 112 and/or the payer institution 110, and/or that the biller service provider 108 is registered for the services described herein, etc. It should be appreciated that other validations may be imposed to confirm/verify the biller service provider 108 and/or other aspects of the request. Once validated, the platform 102 transmits a technical acknowledgement back to the biller service provider 108, at 306. The acknowledgement includes a status of the payment request (e.g., "Received," etc.) and a unique identifier specific to the payment request, each of which are stored by the biller service provider in memory (e.g., as a record associated with the billing schedule, with the biller 104, etc.). The platform 102 may also store a record for the payment request (and corresponding status) in memory associated therewith.

After validation, or based thereon, the platform 102 identifies the payer institution 110 from data included in the request (e.g., an identifier in the request, etc.), and then, at 308, forwards the payment request to the payer institution 110.

In response to receiving the payment request, the payer institution 110 transmits a technical acknowledgement back to the platform 102, at 310. The payer institution 110 also proceeds with confirmation of the payment request, as explained below in FIG. 4. If an interval (e.g., a second, multiple seconds, a minute, multiple minutes, an hour, multiple hours, etc.) passes without the payer institution 110 confirming the transfer consistent with the payment request, a timeout is issued, at 312, whereupon the platform 102 issues, at 314, an error notification to the biller service provider 108 (indicating the payment is not forthcoming), and the biller service provider 108 responds, at 316, with a technical acknowledgement.

The payer institution 110, in turn, transmits, at 310, a technical acknowledgement of the payment request to the payment platform 102.

Figure 4:
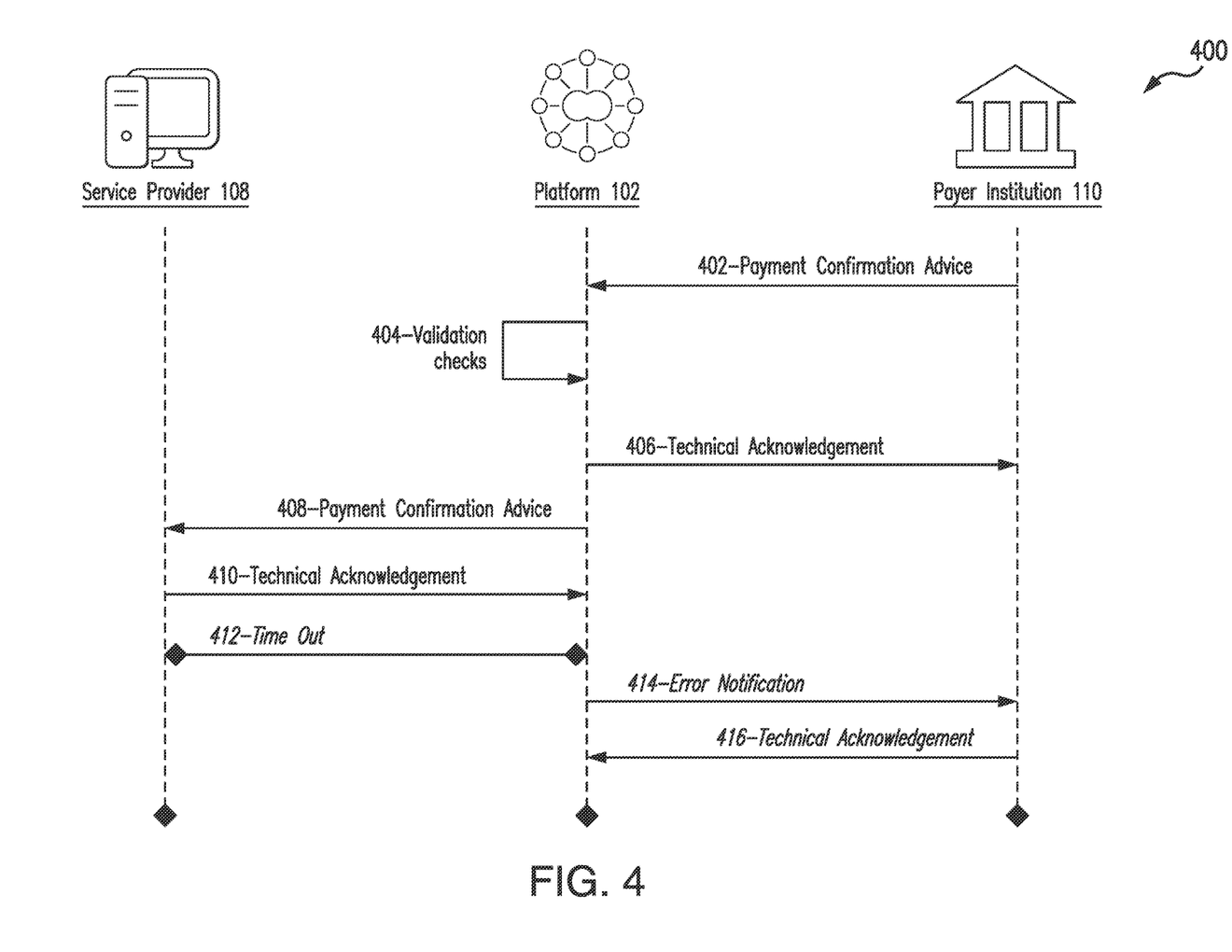
FIG. 4 illustrates an example method, which may be implemented in connection with the system of FIG. 1, for using in responding to a payment request (e.g., the payment request of FIG. 3, etc.), by a payer institution, with a payment confirmation advice.

FIG. 4 illustrates an example method 400 for use in confirmation of a payment request (e.g., the payment request from method 300, etc.), for example, upon receipt by the payer institution 110. The example method 400 is described as implemented in system 100, with reference to the platform 102, the service provider 108 and the payer institution 110, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 400.

As described in the method 300, the payer institution 110 receives a payment request from the platform 102 for payment of a bill (from the biller 104). In response, the payer institution 110 may schedule or other may otherwise manage scheduling (and status) of payments for the bill. In turn, then, the payer institution 110 provides a status of the received request, at 402, via a payment confirmation advice (e.g., payment has been scheduled, payment has been made, etc.). The advice may include one of multiple different payment statuses, including, in this example embodiment, settled, rejected, scheduled, declined or approved. The settled status means that payment of the corresponding bill is immediately triggered. The rejected status means that a triggered payment towards the bill is rejected (e.g., for reasons of insufficient funds, suspected fraud, blocked account, etc.). The scheduled status means that payment towards the bill has been scheduled for a later date, by the payer 112. The declined status means the bill has been declined by the payer institution 110 (e.g., the payer account is closed, etc.). And, the approved status means that the bill has been received and processed, but is a zero-balance bill with no payment made.

In response to the payment confirmation advice (and corresponding status), the platform 102 validates the payment confirmation advice, at 404, and, when validated, transmits a technical acknowledgement to the payer institution 110, at 406. The technical acknowledgement includes an account service reference, which is specific to the payment confirmation advice (where a different account service reference may then be assigned for each payment toward the underlying bill and corresponding payment request). The platform 102 also forwards the payment confirmation advice to the biller service provider 108, at 408. The biller service provider 108 then transmits a technical acknowledgement back to the payment platform 102, at 410, which indicates successful receipt of the payment confirmation advice.

Consistent with the above, if an interval expires prior to the technical acknowledgement from the biller service provider 108, the sequence will time out, at 412, whereupon the platform 102 issues, at 414, an error notification to the payer institution 110 (indicating an error and/or failed delivery of the payment confirmation advice to the biller service provider 108), and the payer institution 110 responds, at 416, with a technical acknowledgement.

It should be appreciated that the operations described above for the methods 300 and 400 may be repeated for each required payment consistent with the billing schedule (e.g., at each payment interval of the billing schedule, etc.).

In connection with the method 400, when the status of the payment request is "scheduled," as provided above (at the payment confirmation advice, at 402), the payer institution 110 also provides another payment confirmation advice, consistent with the above (e.g., after receipt of the technical acknowledgement, at 406; etc.). The second (or further) payment confirmation advice includes another status, which is either settled or rejected (as explained above). In turn, the platform 102 and the biller service provider 108 similarly responds to the second (or further) payment confirmation advice, as described above with reference to steps 404-410. The second (or further) payment confirmation advice additionally includes an account service reference received from the platform 102 in the technical acknowledgement of the first payment confirmation advice (e.g., at step 406, etc.). The account service reference permits the two advices to be linked to one another, and also the original payment request from the service provider 108.

It should be appreciated that if the billing schedule for the given bill indicates payment in multiple partial payments, the payer institution 110 may provide a payment confirmation advice each time a payment is made (each with a different/unique account service reference), while independent payment and settlement records are generated (e.g., by the payer institution 110, etc.) and linked by the corresponding identifier for the payment request and/or account service reference(s) for the payment confirmation advise(s). It should also be appreciated that the biller service provider 108 may not support multiple partial payments, or wishes to reject any partial payment, whereby the biller service provider 108 is permitted to indicate the same in acknowledgment to the first payment confirmation advice.

Figure 5:
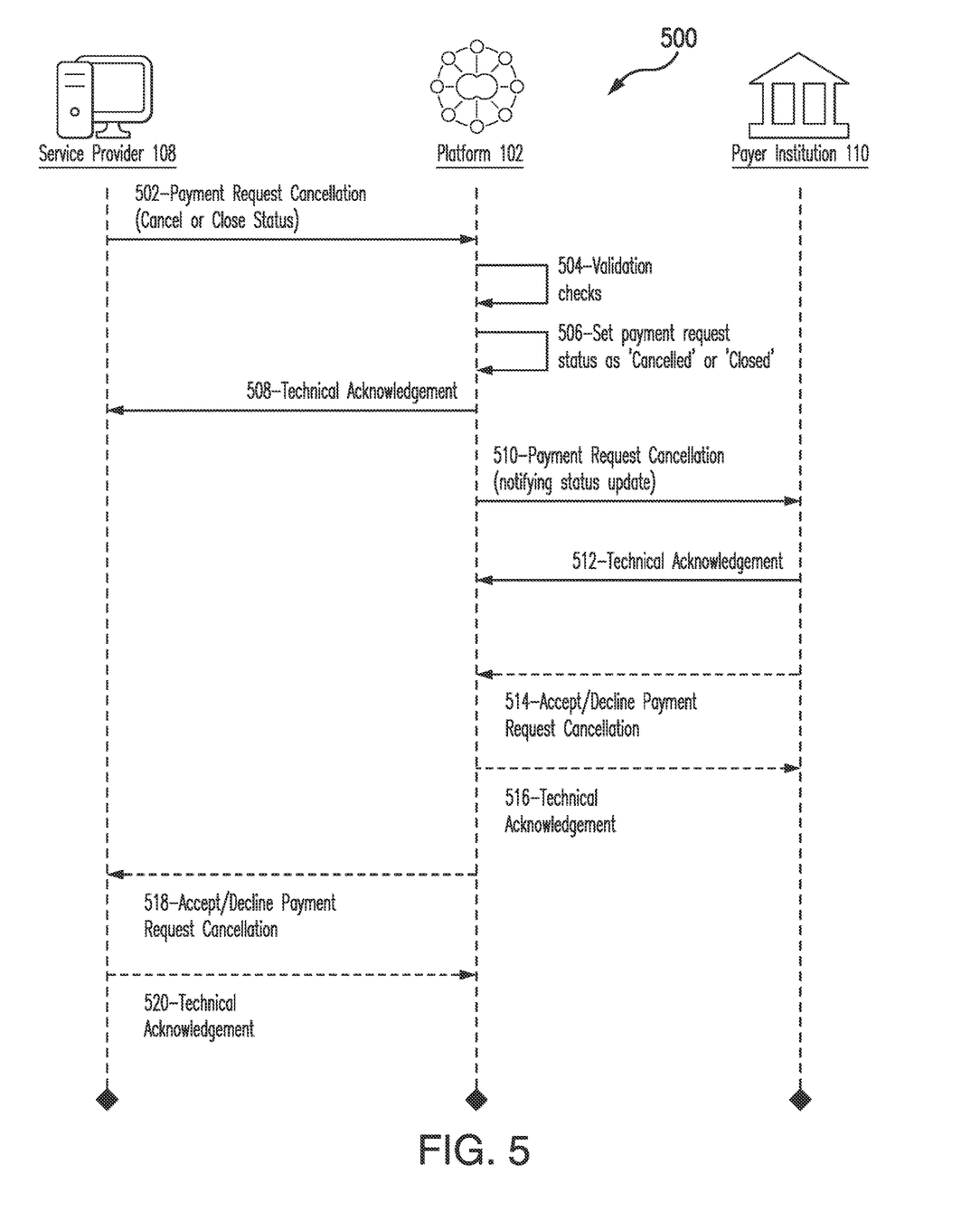
FIG. 5 illustrates an example method, which may be implemented in connection with the system of FIG. 1, for using in submitting a payment request cancellation (e.g., for the payment request of FIG. 3, etc.) by a biller service provider.

FIG. 5 illustrates an example method 500 for use in cancelling (or closing) (broadly, ending) a payment request (e.g., the payment request from method 300, etc.), for example, that is submitted by the biller service provider 108. The example method 500 is described as implemented in system 100, with reference to the platform 102, the service provider 108 and the payer institution 110, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 500.

As described in the method 300, the biller service provider 108 may submit a payment request for payment of a bill (from the biller 104) in accordance with billing schedule. However, after submitting the payment request, the biller service provider 108 (or upon instruction from the biller 104) may decide that the request was incorrect or was submitted in error, or is no longer needed/required. For example, the bill may have already been paid (whereby the payment request may need to be closed), or the bill may have included an incorrect amount (whereby the payment request may need to be cancelled), or the bill may have been a duplicate (whereby the payment request may need to be cancelled), or the bill may need to be revised/updated (whereby the payment request may need to be cancelled), etc. In connection with cancelling a payment request, for example, as shown in FIG. 5, the biller service provider 108 submits, at 502, a payment request cancellation (broadly, a request to end the payment request). It should be appreciated that the method 500 of FIG. 5 similarly applies to a payment request closure, for example, where the payment request closure is submitted at 502.

The payment request cancellation includes a unique identifier specific to the payment request to be cancelled, as received from the platform 102 (e.g., at step 306 in method 300, etc.), as well as a reason (e.g., a reason code, etc.) for the cancellation. Example reason codes for the payment request cancellation may include, without limitation, AM09 (wrong amount), DT01 (invalid date), DUPL (duplicate payment), MODT (modified transaction), FRAD (suspicion of fraud), TECH (technical problem), ACLR (already cancelled payment request), etc. In addition, in implementations where a payment request closure is submitted at step 502, the payment request closure may similarly include a unique identifier specific to the payment request to be closed as well as a reason (e.g., a reason code, etc.) for the closure. Example reason codes for the payment request closure may include, without limitation, PAID (already paid transaction), NRFP (new payment request raised/submitted for same bill/transaction), etc.

In response to the cancellation request (or closure request), the platform 102 validates the payment request cancellation (or payment request closure), at 504. The validation may include a check to confirm the appropriate information is included, such as, for example, a complete and proper identifier for the account of the user 112 and/or the payer institution 110, the correct identifier for the original payment request, an indication that the same payment service provider 108 submitted the cancellation request (or closure request) and the original payment request, etc. Once validated, the platform 102 updates the payment request status to be "closed" or "cancelled," at 506, and transmits a technical acknowledgement back to the biller service provider 108, at 508. The acknowledgement includes the updated status of the payment request (e.g., "Closed" or "Cancelled," etc.). For instance, the platform 102 may access a record for the payment request (e.g., based on the unique identifier specific to the payment request, etc.) (and corresponding status) in memory associated therewith, and update the status.

Also, the platform 102 forwards the payment request cancellation (or payment request closure) to the payer institution 110, at 510, thereby updating the status of the payment request at the payer institution (e.g., to cancelled or closed, etc.). The payer institution 110, in turn, transmits, at 512, a technical acknowledgement of the a payment request cancellation (or payment request closure) to the platform 102. The acknowledgement generally indicates successful receipt of the payment request cancellation (or payment request closure). If an interval passes without the payer institution 110 confirming the transfer consistent with the payment request, a timeout may issue whereupon the platform 102 issues an error notification to the biller service provider 108 (indicating the cancellation has failed or has timed out).

Optionally in the method 500, as indicated by the dashed arrowed lines in FIG. 5, upon receipt of the payment request cancellation from the platform 102, the payer institution 110 may evaluate the cancellation and either accept or decline the cancellation (e.g., based on the parties involved in the underlying request, based on a history of one or more parties involved in the underlying request, based on a market location in which the system 100 is implemented, etc.) (e.g., via an API, etc.). The payer institution 110 then transmits, at 514, a response to the platform 102 indicating the same, for example, that the payment request cancellation is either accepted or declined. In response, the platform 102 transmits, at 516, a technical acknowledgement back to the payer institution 110 confirming receipt of the response from the payer institution 110 (and the corresponding indication of acceptance or decline of the payment request cancellation). The payer institution 110 may also transmit a notification of the cancellation information (and corresponding acceptance or decline thereof) to the user 112 (e.g., at the user's communication device 114, etc.). It should be appreciated that, when such optional operations are performed (or are applicable) (e.g., where the option is available for the payer institution 110 to evaluate the cancellation and either accept or decline the cancellation at steps 514-520, etc.), the platform 102 may not update (or may not need to update) the payment request status, at 506, to be "closed" or "cancelled" (e.g., step 506 may not yet be performed, etc.). Instead, the platform 102 may wait to change the status of the payment request to "closed" or "cancelled" after (or in response to) receiving an accept response at 514 (e.g., step 506 may be performed after step 514 in this optional scenario, etc.). With that said, it is noted that there would be no change to the payment request status if a decline response is received at 514.

In addition, the platform 102 forwards, at 518, the response from the biller service provider 108 indicating that the payment request cancellation is either accepted or declined. And, the biller service provider 108, in turn, transmits, at 520, a technical acknowledgement of the a response to the platform 102. The acknowledgement generally indicates successful receipt of the request. Additionally, the biller service provider 108 may notify the biller 104 of the updated status of the cancellation so that the biller 104 is also aware, whereby the biller 104 and/or the biller service provider 108 may proceed accordingly (e.g., seek reversal of the transaction when the payment request cancellation is declined or otherwise remedy the transfer, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving, from a service provider, a request indicative of a payment action by a third party; (b) issuing a first technical acknowledgment to the service provider in response to the request, the first technical acknowledgement including a unique identifier for the payment action; (c) forwarding the request to the third party; (d) receiving, from the third party, a confirmation advise specific to the request, the confirmation advise including a status of the request; then (e) after forwarding the request to the third party, receiving an end request (e.g., a cancellation request, a closure request, etc.) specific to the request, the end request including the unique identifier for the payment action; and (f) in response to the end request: (i) changing the status of the request to cancelled or closed; and (ii) forwarding the end request to the third party.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in cancelling or closing a request, the method comprising:
    receiving, by a computing device of a processing network, from a service provider, a request indicative of a payment action by a payer institution, the service provider being a biller service provider, the biller service provider being separate from the processing network, and the payer institution being separate from the processing network;
    issuing, by the computing device, a first technical acknowledgment to the service provider in response to the request from the service provider, the first technical acknowledgement including a unique identifier for the payment action;
    identifying, by the computing device, the payer institution based on the request; and then,
    forwarding, by the computing device, the request from the service provider to the identified payer institution;
    receiving, by the computing device, from the payer institution, a confirmation advise specific to the request from the service provider, the confirmation advise including a status of the request indicating that the payment action is scheduled for a later date; and then,
    after forwarding the request from the service provider to the payer institution, receiving, by the computing device, from the service provider, a payment request cancellation specific to the payment action, the payment request cancellation including said unique identifier for the payment action and a reason code for the payment request cancellation, the reason code indicating one of: a wrong amount, an invalid date, a duplicate payment, or a modified transaction; and then,
    in response to the payment request cancellation:
        changing, by the computing device, the status of the request from the service provider from scheduled to cancelled or closed according to the payment request cancellation;
        issuing, by the computing device, a second technical acknowledgment for the payment request cancellation to the service provider; and
        forwarding, by the computing device, the payment request cancellation to the payer institution;
    in response to the forwarded payment request cancellation, receiving, by the computing device, from the payer institution, a reply specific to the payment request cancellation, the reply including an approval of the payment request cancellation;
    in response to the reply specific to the payment request cancellation:
        issuing, by the computing device, a third technical acknowledgment for the payment request cancellation to the service provider; and
        forwarding, by the computing device, the reply specific to the payment request cancellation to the service provider;
    wherein the request indicative of the payment action, the first technical acknowledgment, the confirmation advise specific to the request, the payment request cancellation, the second technical acknowledgment, the reply specific to the payment request cancellation and the third technical acknowledgment are each consistent with an International Organization for Standardization (ISO) 20022 format.

2. The computer-implemented method of claim 1, wherein the request from the service provider includes a payment request specific to a bill to be paid by an account issued by the payer institution.

3. The computer-implemented method of claim 2, wherein receiving the request from the service provider includes receiving the request from the service provider consistent with a billing schedule defining the payment action from the account to a biller associated with the biller service provider.

4. The computer-implemented method of claim 1, further comprising, in response to the payment request cancellation, validating the payment request cancellation based on the unique identifier for the payment action prior to changing the status of the request from the service provider.

5. The computer-implemented method of claim 4, wherein issuing, by the computing device, the second technical acknowledgment to the service provider is based on validation of the payment request cancellation.

6. A non-transitory computer-readable storage medium comprising executable instructions for ending a request, which when executed by at least one processor associated with platform computing device of a processing network, cause the at least one processor to:
    receive, from a service provider, a request indicative of a payment action by a payer institution, the service provider being a biller service provider;
    issue a first technical acknowledgment to the service provider in response to the request from the service provider, the first technical acknowledgement including a unique identifier for the payment action and a status of the request;
    identify the payer institution based on the request; and then,
    forward the request from the service provider to the identified payer institution;

receive, from the payer institution, a confirmation advise specific to the request from the service provider, the confirmation advise including a status of the request indicating that the payment action is scheduled for a later date; and then, receive, from the service provider, a payment request cancellation specific to the payment action, the payment request cancellation including said unique identifier for the payment action and a reason code for the payment request cancellation; and in response to the payment request cancellation:
  change the status of the request from the service provider from scheduled to cancelled or closed according to the payment request cancellation; and
  issue a second technical acknowledgment for the payment request cancellation to the service provider; and
  forward the payment request cancellation to the payer institution;

in response to the forwarded payment request cancellation, receive, from the payer institution, a reply specific to the payment request cancellation, the reply including an approval of the payment request cancellation;

in response to the reply specific to the payment request cancellation:
  issue a third technical acknowledgment for the payment request cancellation to the service provider; and
  forward the reply specific to the payment request cancellation to the service provider;

wherein the request indicative of the payment action, the first technical acknowledgment, the confirmation advise specific to the request, the payment request cancellation, the second technical acknowledgment, the reply specific to the payment request cancellation and the third technical acknowledgment are each consistent with an International Organization for Standardization (ISO) 20022 format.

7. The non-transitory computer-readable storage medium of claim 6, wherein the request from the service provider includes a payment request specific to a bill to be paid by an account issued by the payer institution.

8. The non-transitory computer-readable storage medium of claim 6, wherein the executable instructions, when executed by the at least one processor, further cause the at least one processor to, in response to the payment request cancellation, validate the payment request cancellation based on the unique identifier for the payment action.

9. The non-transitory computer-readable storage medium of claim 8, wherein the executable instructions, when executed by the at least one processor, cause the at least one processor to issue the second technical acknowledgement further in response to validation of the payment request cancellation.

\* \* \* \* \*